(12) United States Patent (10) Patent No.: US 6,641,413 B2
Kuroda (45) Date of Patent: Nov. 4, 2003

(54) CARD CONNECTOR APPARATUS CAPABLE OF RECEIVING PLURAL KINDS OF CARDS

(75) Inventor: Yoshimasa Kuroda, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/180,246

(22) Filed: Jun. 25, 2002

(65) Prior Publication Data

US 2003/0013334 A1 Jan. 16, 2003

(30) Foreign Application Priority Data

Jul. 12, 2001 (JP) ........................................ 2001-212518
Aug. 2, 2001 (JP) ........................................ 2001-234696

(51) Int. Cl.[7] .............................................. H01R 13/62
(52) U.S. Cl. ........................ 439/159; 439/60; 439/924.1; 439/630
(58) Field of Search ................................ 439/159, 157, 439/328, 352, 923, 259, 951, 630, 372, 160, 74, 331, 60, 924.1; 361/735, 737

(56) References Cited

U.S. PATENT DOCUMENTS

| | | | | |
|---|---|---|---|---|
| 5,115,376 A | * | 5/1992 | Nakajima | .................. 361/798 |
| 5,364,275 A | * | 11/1994 | Ota et al. | ...................... 439/65 |
| 5,716,221 A | * | 2/1998 | Kantner | ....................... 439/64 |
| 5,725,385 A | * | 3/1998 | Takano et al. | ................. 439/64 |
| 5,933,328 A | * | 8/1999 | Wallace et al. | ............. 361/737 |
| 6,004,155 A | | 12/1999 | Wu | |
| 6,241,545 B1 | * | 6/2001 | Bricaud et al. | ............. 439/326 |
| 6,386,920 B1 | * | 5/2002 | Sun | ............................. 439/630 |
| 6,402,529 B2 | * | 6/2002 | Saito et al. | .................... 439/74 |
| 6,468,101 B2 | * | 10/2002 | Suzuki | ....................... 439/326 |
| 6,471,550 B2 | * | 10/2002 | Maiterth et al. | ............ 439/631 |

* cited by examiner

*Primary Examiner*—Gary Paumen
*Assistant Examiner*—Edwin A. León
(74) *Attorney, Agent, or Firm*—Beyer Weaver & Thomas

(57) ABSTRACT

A slide member is provided with a presser plate portion for restraining a first connector terminal from protruding into a storage portion at a card ejection position, first fastening portions not coming in contact with a second card but coming in contact with only a first card, and a second fastening portion coming in contact with only a front end portion of the second card, and at a time of insertion of the second card, after the second card passes the first fastening portions to come in contact with the second fastening portion, the slide member is moved from the card ejection position to the card installation position, and the first connector terminal comes away from restraint of the presser plate portion and protrudes into the storage portion.

8 Claims, 15 Drawing Sheets

CARD CONNECTOR APPARATUS CAPABLE OF RECEIVING PLURAL KINDS OF CARDS

BACKGROUND OF THE INVENTION

1. Field of the Invention

The present invention relates to a structure of a card connector apparatus used for small memory cards for use in various portable information terminals, such as a portable telephone or a PC, or memory support equipments such as a digital camera or a digital AV equipment.

2. Description of the Related Art

A card connector apparatus is generally used as an expanded recording apparatus of an electronic equipment such as a personal computer or a digital camera. As a storage medium of the card connector apparatus, a PC card or a memory card has come into wide use.

This PC card or memory card is installed in the card connector apparatus to write and read necessary information. In recent years, as small memory cards, various kinds of memory cards having different shapes, such as a long one, a short one, a thick one, or a thin one, have been developed, and various kinds of card connector apparatuses corresponding to these have been developed.

In this case, the card connector apparatus corresponds to only one kind of memory card, and only one specific memory card has been installed in one card connector apparatus. Thus, in the case where various kinds of memory cards are desired to be used, it has been necessary to prepare card connector apparatuses dedicated to the respective memory cards.

However, in the case where card connector apparatuses dedicated to the respective memory cards are prepared, there have been problems that an electronic equipment in which the card connector apparatuses are mounted becomes large, and when a memory card is installed, a defect occurs that a different kind of memory card is erroneously inserted into a different card connector.

Accordingly, in order to enable installation of two cards having different lengths, there has been proposed a structure in which connector terminal portions capable of coming in contact with contact terminal portions of the respective cards are disposed in two lines in front and in rear in the insertion direction of the card, however, in such structure, in the case where a longer card is inserted, since the long card gets over the connector terminal disposed this side and is moved to the position where it comes in contact with the connector terminal disposed at the inner side, there have been problems that the long card is rubbed with the connector terminal at this side and the bottom is worn away, and the resistance at the time of insertion becomes large. Besides, when ejecting mechanisms are provided for the respective cards, the structure becomes complicated, and the whole apparatus becomes large.

SUMMARY OF THE INVENTION

Accordingly, the invention has an object to provide a card connector apparatus which solves the foregoing problems and in which connector terminals are disposed in front and in rear in an insertion direction of a card to enable installation of cards having different lengths, and the respective cards can be smoothly inserted at the time of insertion of the cards. Besides, another object is to eject the respective cards by a simple structure.

In order to solve the above problems, first means of the invention comprises a housing including a storage portion in which both a first short card and a second long card can be installed, a first connector terminal to be connected with a contact terminal portion of the first card, a second connector terminal to be connected with a contact terminal portion of the second card, the first and the second connector terminals being arranged in two lines in front and in rear in a card insertion direction of the storage portion, a slide member disposed to be movable in the card insertion direction in accordance with insertion of a card, and lock means for locking the slide member at a card installation position, and is characterized in that the slide member is provided with a presser plate portion to come in contact with the first connector terminal at a card ejection position to restrain the first connector terminal from protruding into the storage portion, first fastening portions provided at a front side and not coming in contact with the second card but coming in contact with only a front end portion of the first card, and a second fastening portion provided behind the first fastening portions and coming in contact with only a front end portion of the second card, and at a time of insertion of the second card, after the second card passes the first fastening portions to come in contact with the second fastening portion, the slide member is moved from the card ejection position to the card installation position, and the first connector terminal comes away from restraint of the presser plate portion and protrudes into the card storage portion.

Besides, second means comprises a housing including a storage portion in which both a first short card and a second long card can be installed, a first connector terminal to be connected with a contact terminal portion of the first card, a second connector terminal to be connected with a contact terminal portion of the second card, the first and the second connector terminals being arranged in two lines in front and in rear in a card insertion direction of the storage portion, a slide member disposed to be movable in the card insertion direction in accordance with insertion of a card, and lock means for locking the slide member at a card installation position, and is characterized in that the slide member is divided in two parts in front and in rear to include a first slide member and a second slide member, the first slide member is provided with a presser plate portion to come in contact with the first connector terminal at a card ejection position to restrain the first connector terminal from protruding into the storage portion, and first fastening portions provided at a front side and not coming in contact with the second card but coming in contact with only a front end portion of the first card, the second slide member is provided with a second fastening portion provided at a rear side and coming in contact with only a front end portion of the second card, and at a time of insertion of the first card, after the first card comes in contact with the first fastening portions, the first slide member is moved to the card installation position while pressing the second slide member, and at a time of insertion of the second card, after the second card passes the first fastening portions to come in contact with the second fastening portion, only the second slide member is moved to the card installation position.

Besides, third means is characterized in that the first card is formed to be wide and thin, the second card is formed to be narrower and thicker than the first card, the first fastening portions are formed at opposite positions of inside portions of the slide member, and a width between the first fastening portions is formed to be narrower than a width of the first card and wider than a width of the second card.

Besides, fourth means is characterized in that the slide member is urged toward a card ejecting direction by an urging member, and the lock means is constituted by a heart-shaped cam groove formed at one of the slide member and the housing, and an engagement pin provided at the other and engaging with the heart-shaped cam groove.

DETAILED DESCRIPTION OF THE PREFERRED EMBODIMENTS

Figure 2:
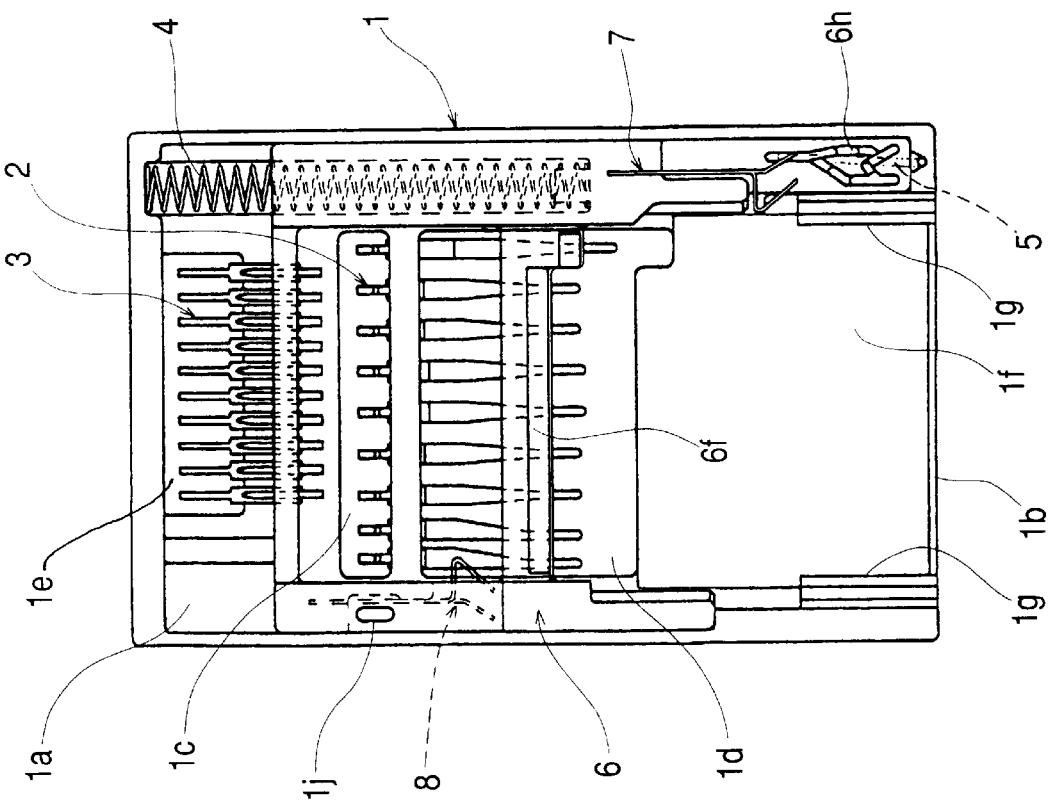
FIG. 2 is a plan view showing a state where a cover is removed from the card connector apparatus of the same of the invention.
Figure 1:
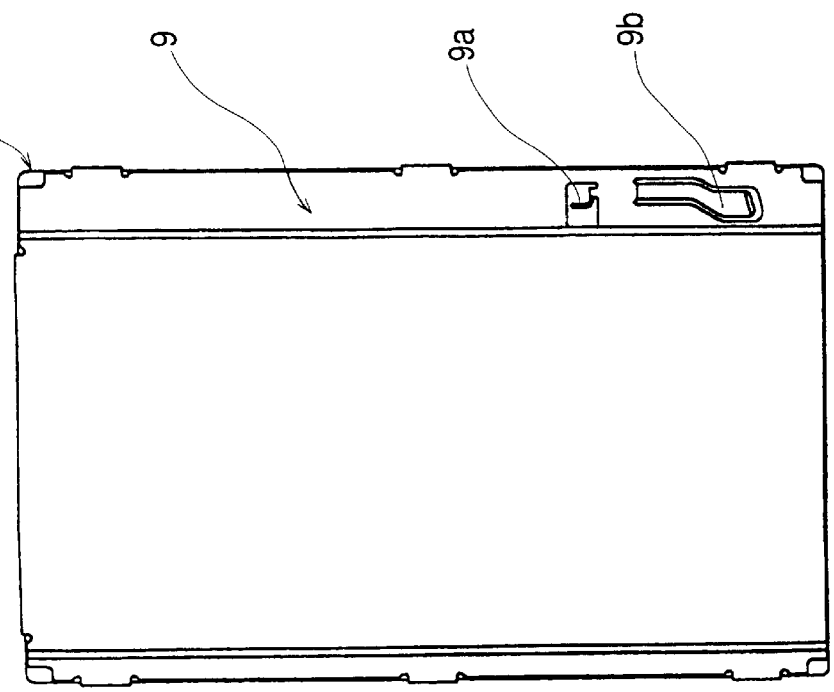
FIG. 1 is a plan view showing a card connector apparatus of an embodiment of the invention.
Figure 3:
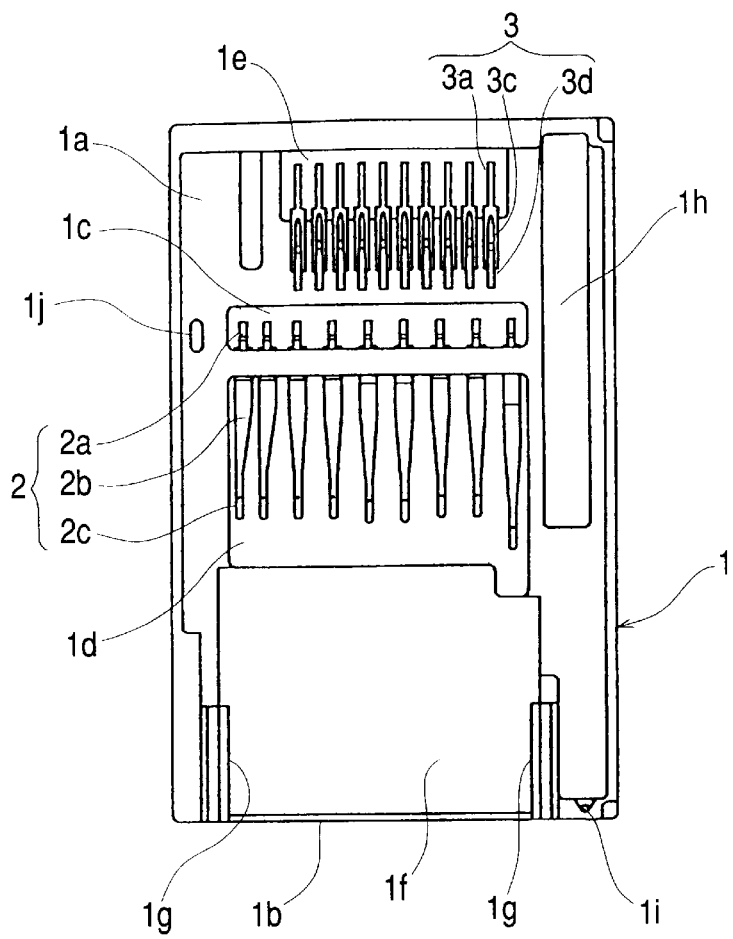
FIG. 3 is a plan view showing a housing of the same of the invention.
Figure 4:
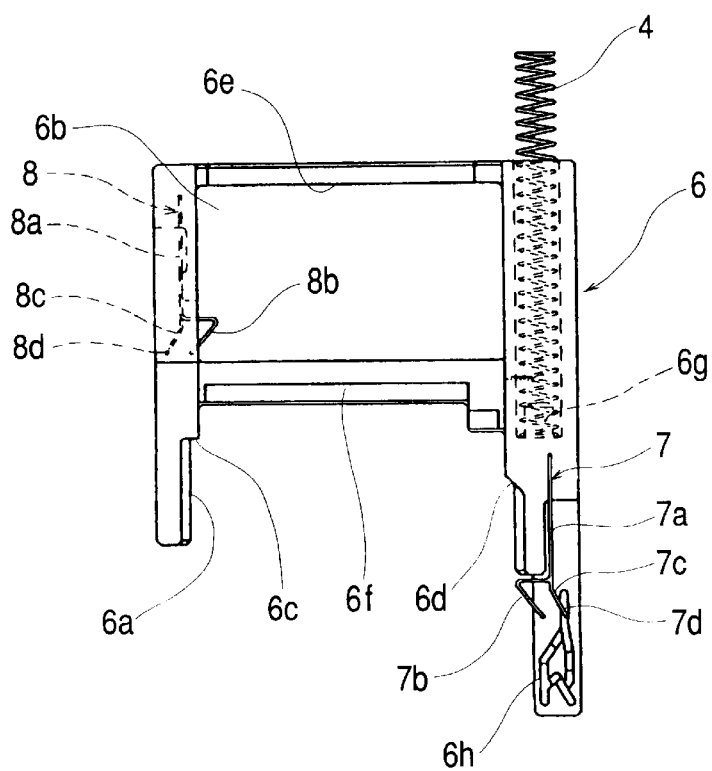
FIG. 4 is a plan view showing a slide member of the same of the invention.
Figure 5:
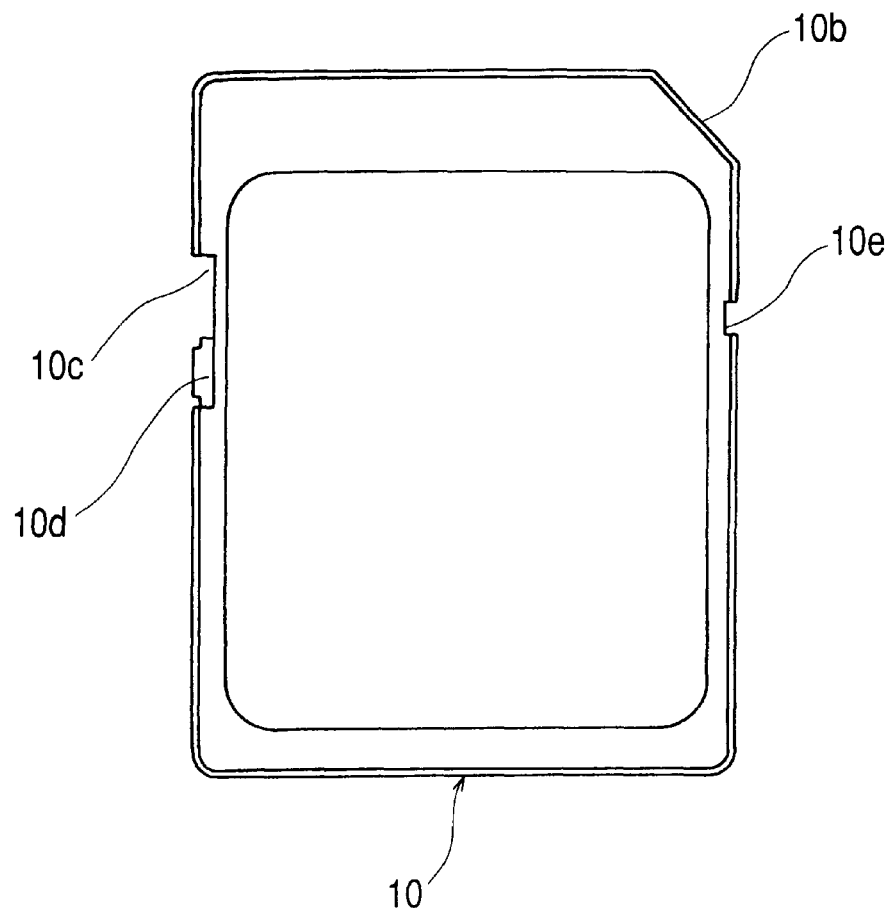
FIG. 5 is a plan view showing a first card of the same of the invention.
Figure 6:
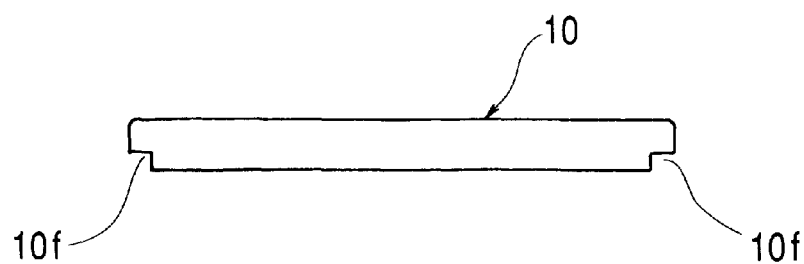
FIG. 6 is a front view showing the first card of the same of the invention.
Figure 7:
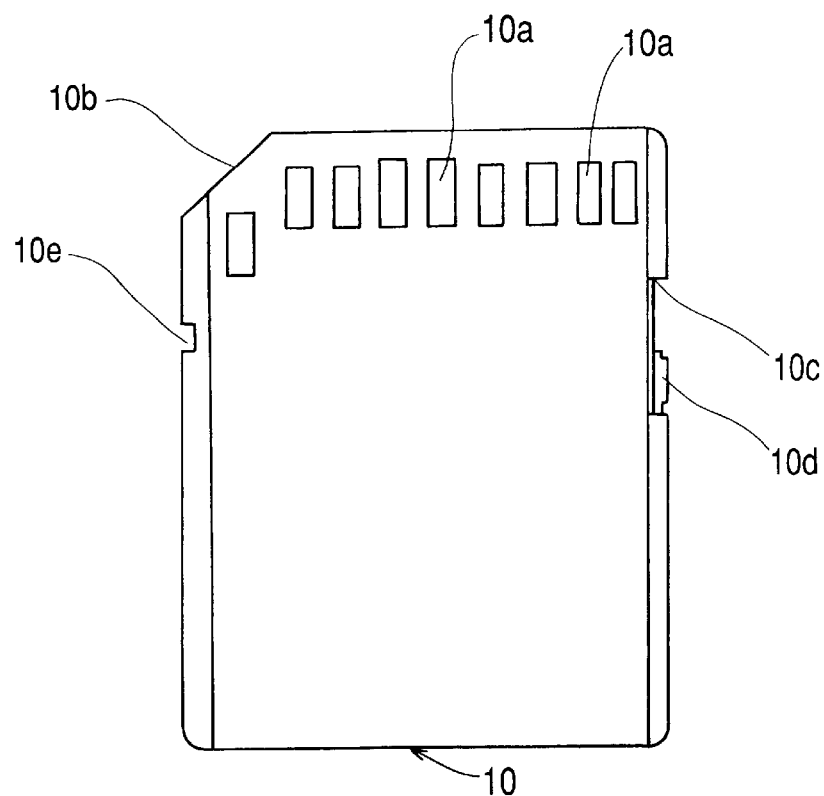
FIG. 7 is a bottom view showing the first card of the same of the invention.
Figure 8:
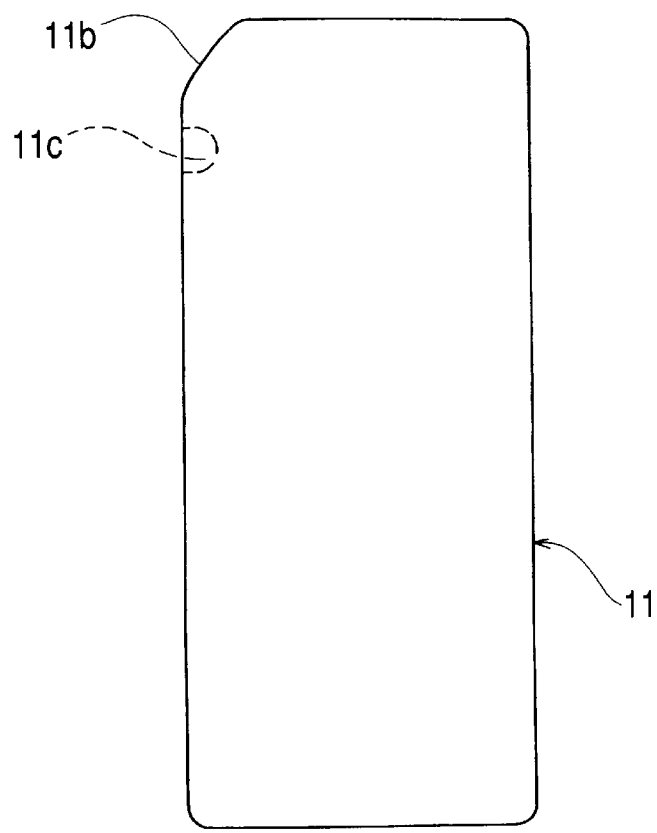
FIG. 8 is a plan view showing a second card of the same of the invention.
Figure 9:
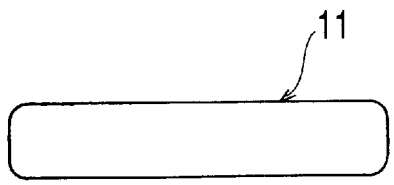
FIG. 9 is a front view showing the second card of the same of the invention.
Figure 10:
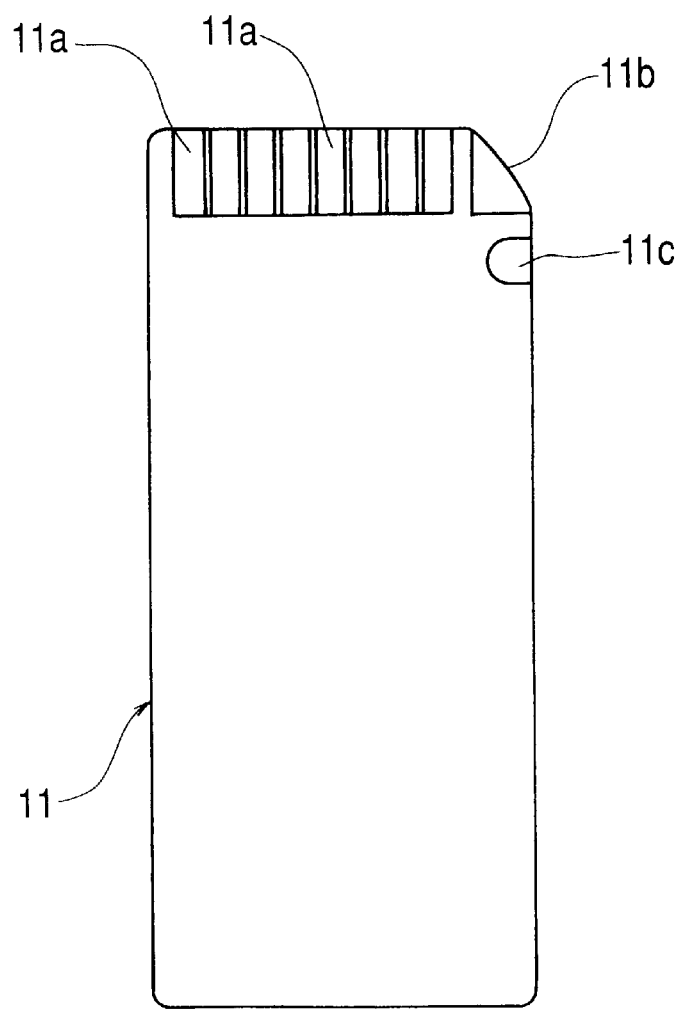
FIG. 10 is a bottom view showing the second card of the same of the invention.
Figure 11:
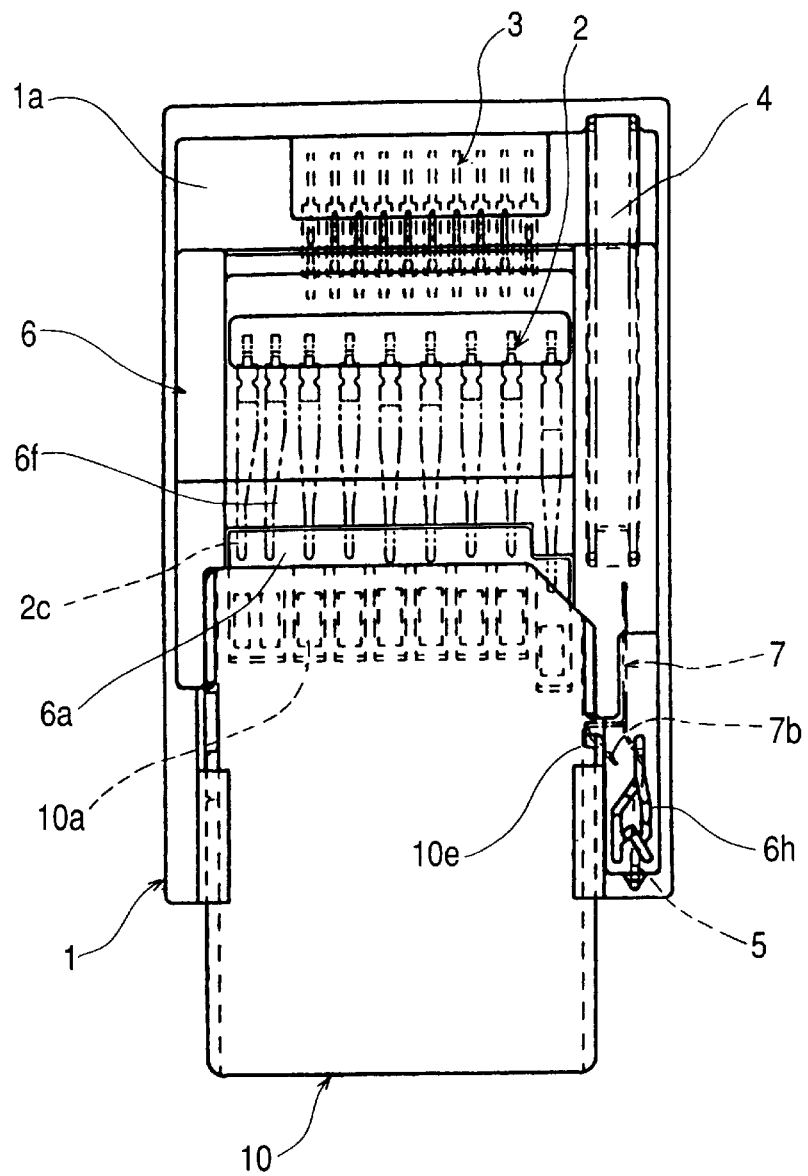
FIG. 11 is a plan view showing the card connector apparatus at the time of ejection of the fist card of the invention.
Figure 12:
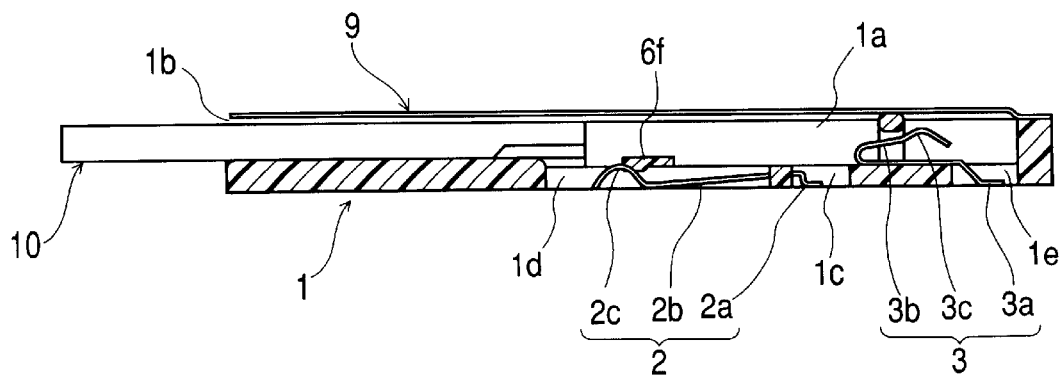
FIG. 12 is a longitudinal sectional view showing the card connector apparatus at the time of ejection of the fist card of the invention.
Figure 13:
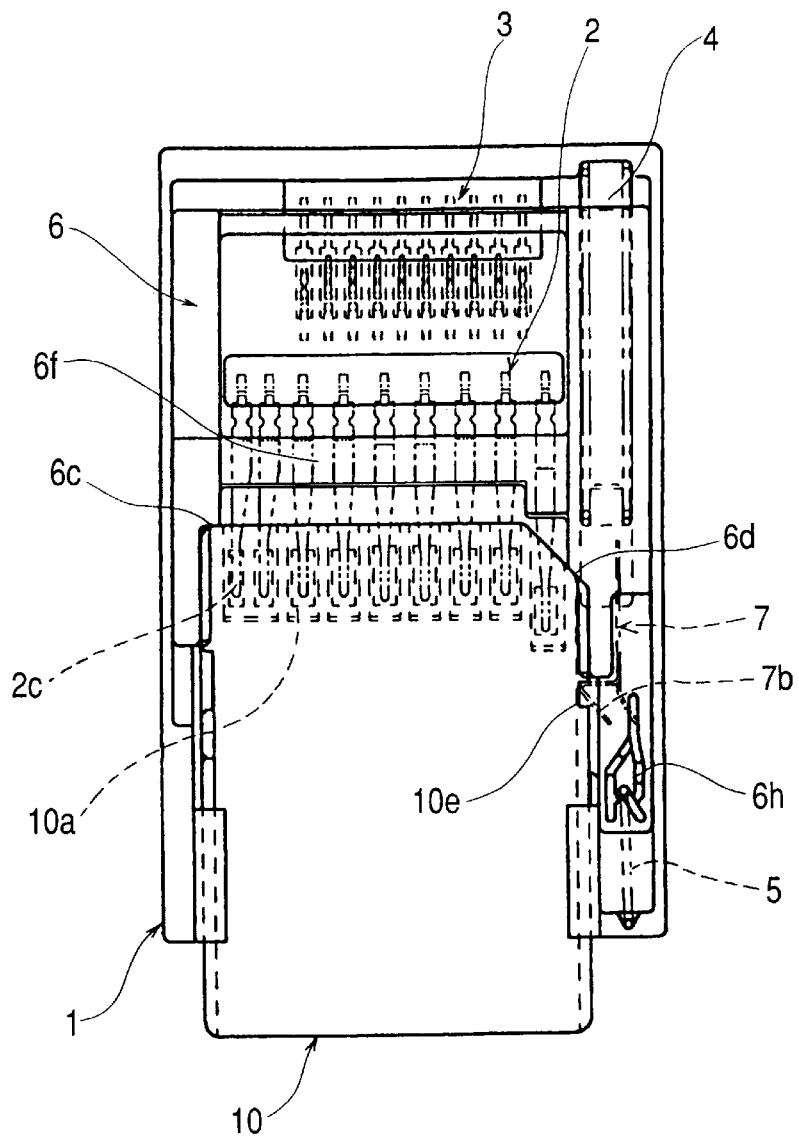
FIG. 13 is a plan view showing the card connector apparatus at the time of installation of the fist card of the invention.
Figure 14:
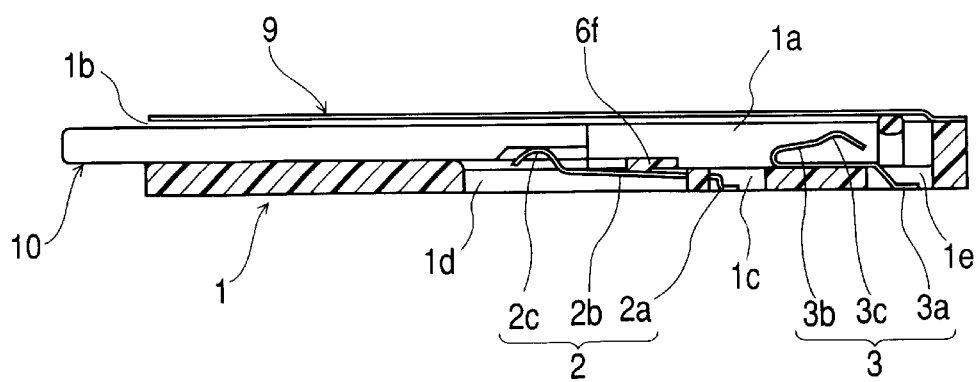
FIG. 14 is a longitudinal sectional view showing the card connector apparatus at the time of installation of the fist card of the invention.
Figure 15:
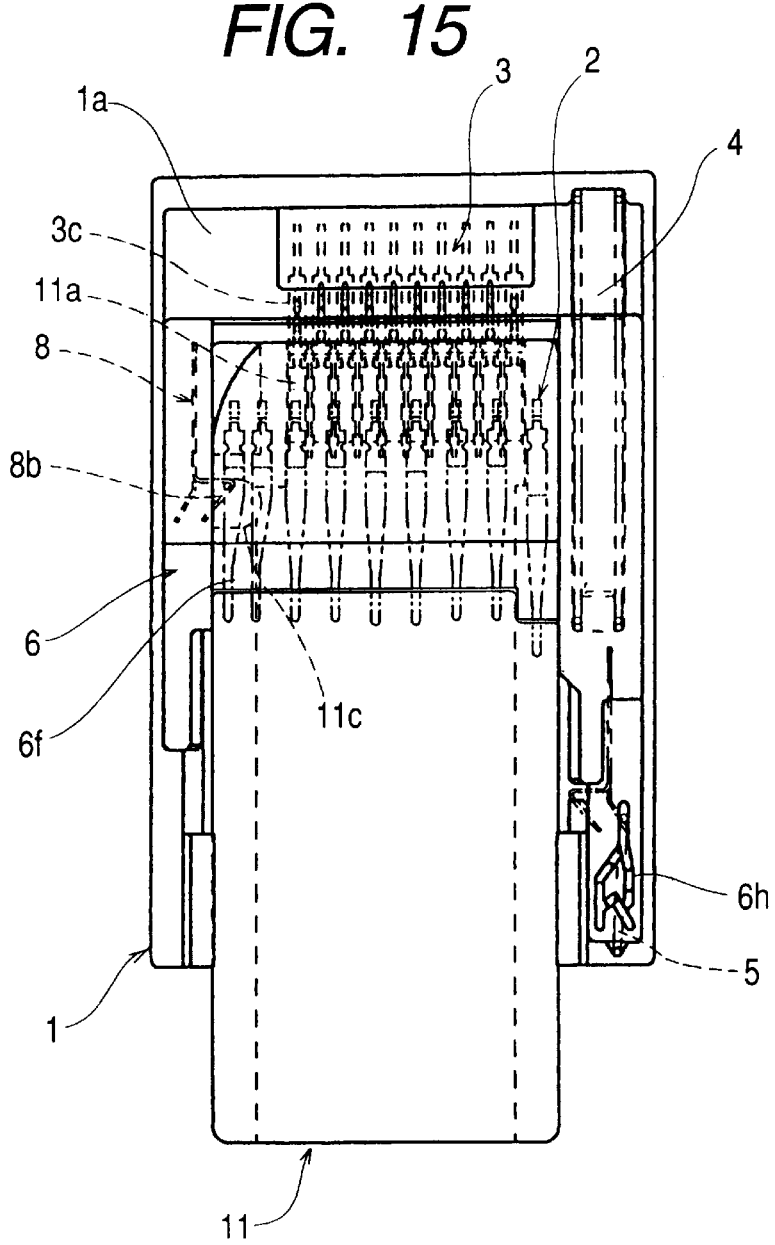
FIG. 15 is a plan view showing the card connector apparatus at the time of ejection of the second card of the invention.
Figure 16:
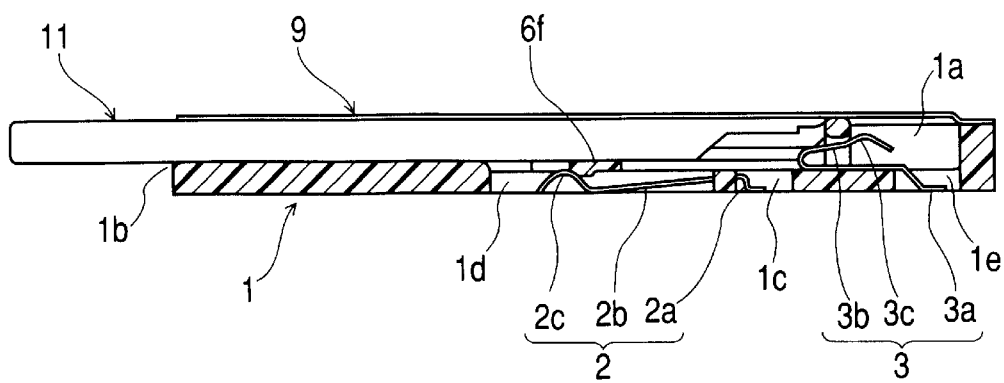
FIG. 16 is a longitudinal sectional view showing the card connector apparatus at the time of ejection of the second card of the invention.
Figure 17:
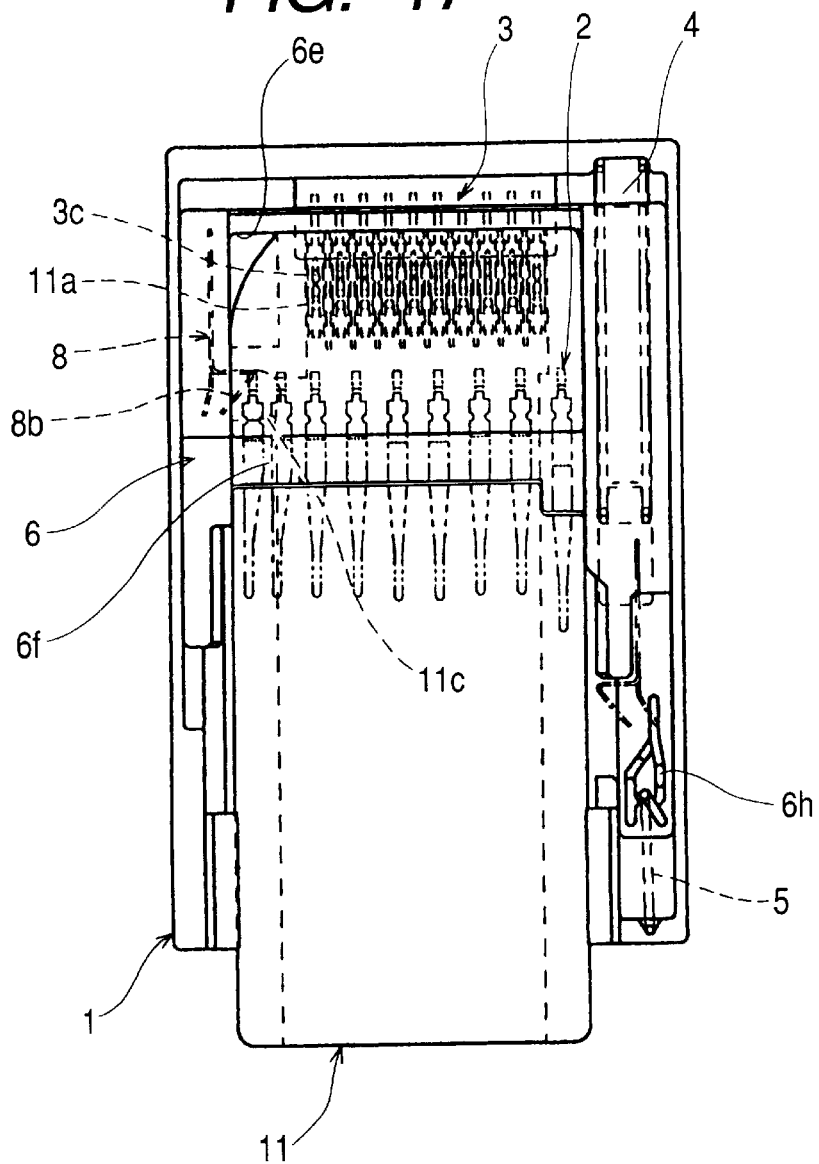
FIG. 17 is a plan view showing the card connector apparatus at the time of installation of the second card of the invention.
Figure 18:
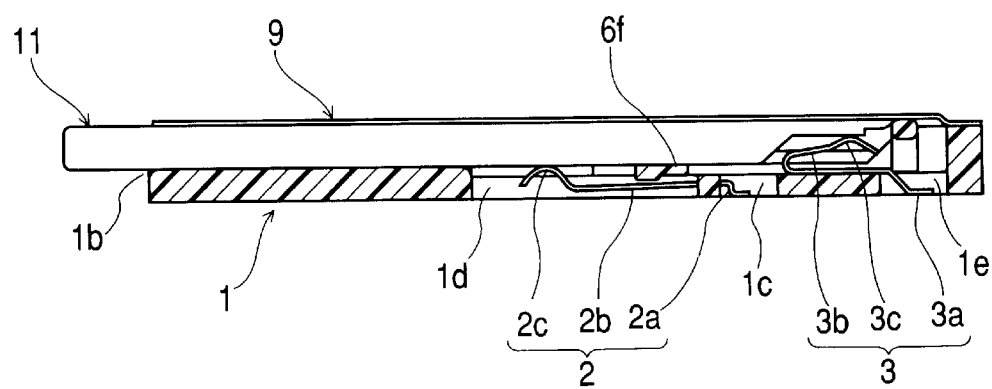
FIG. 18 is a longitudinal sectional view showing the card connector apparatus at the time of installation of the second card of the invention.
Figure 19:
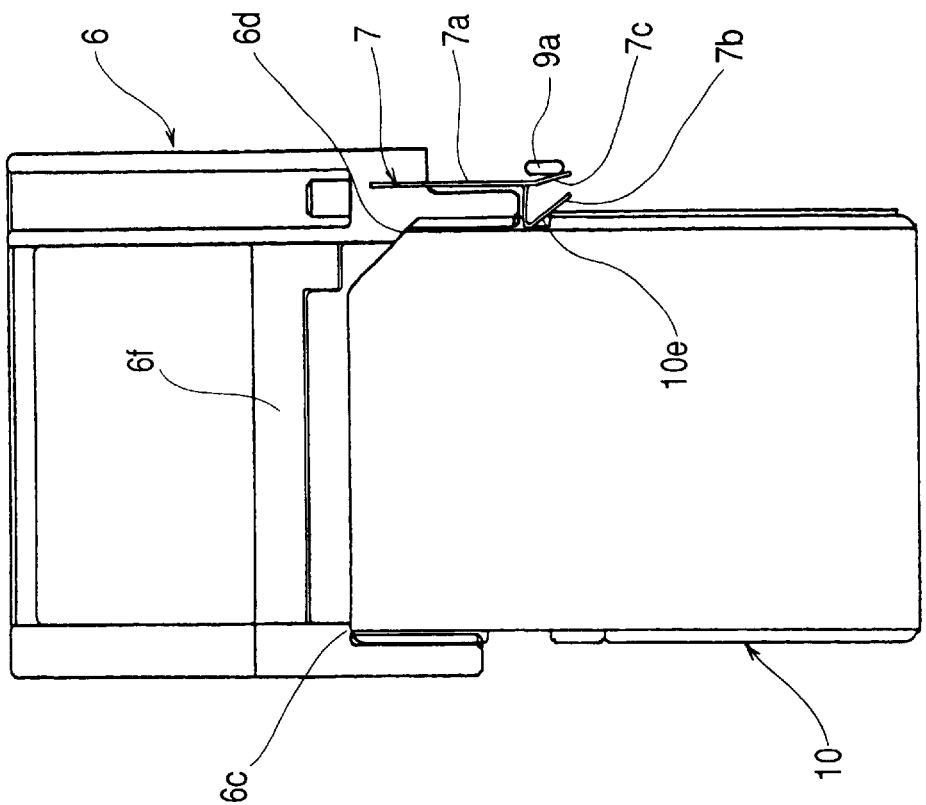
FIG. 19 is a partial explanatory view showing a state of engagement with a holding member at the time of ejection of the first card.
Figure 20:
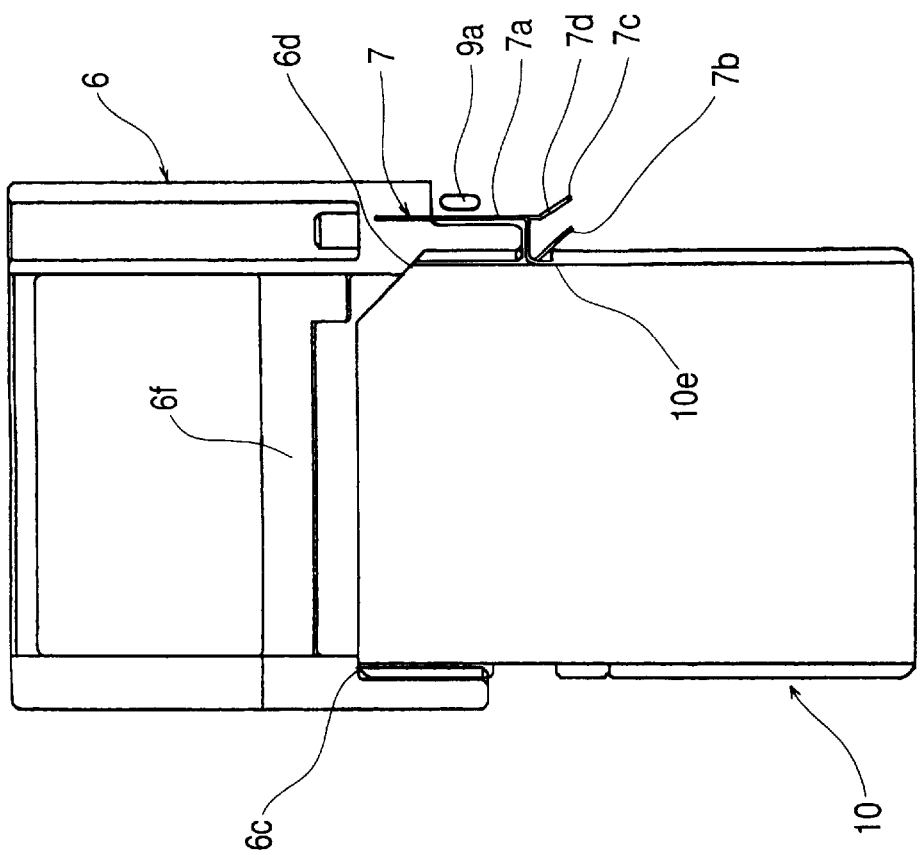
FIG. 20 is a partial explanatory view showing a state of engagement with the holding member at the time of installation of the first card of the invention.
Figure 21:
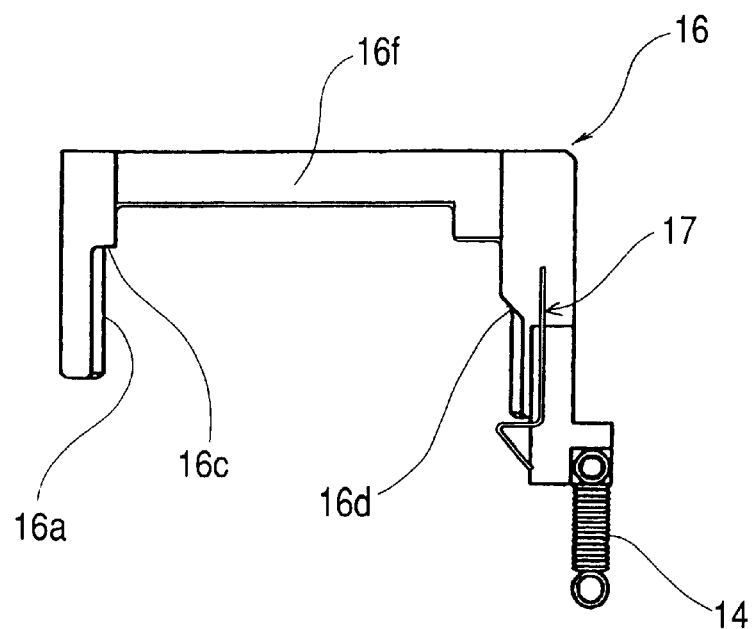
FIG. 21 is a plan view showing a first slide member of another embodiment of the invention.
Figure 22:
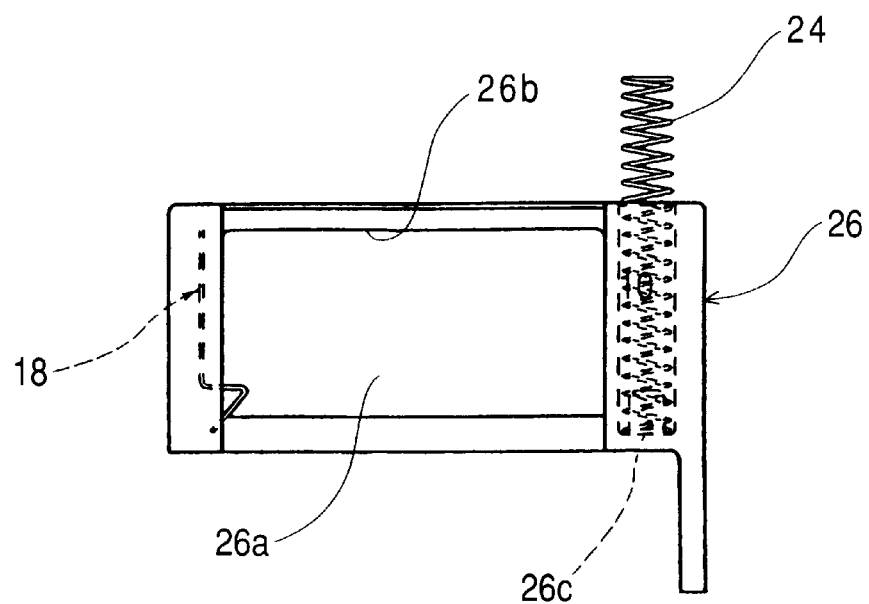
FIG. 22 is a plan view showing a second slide member of the same of the invention.
Figure 23:
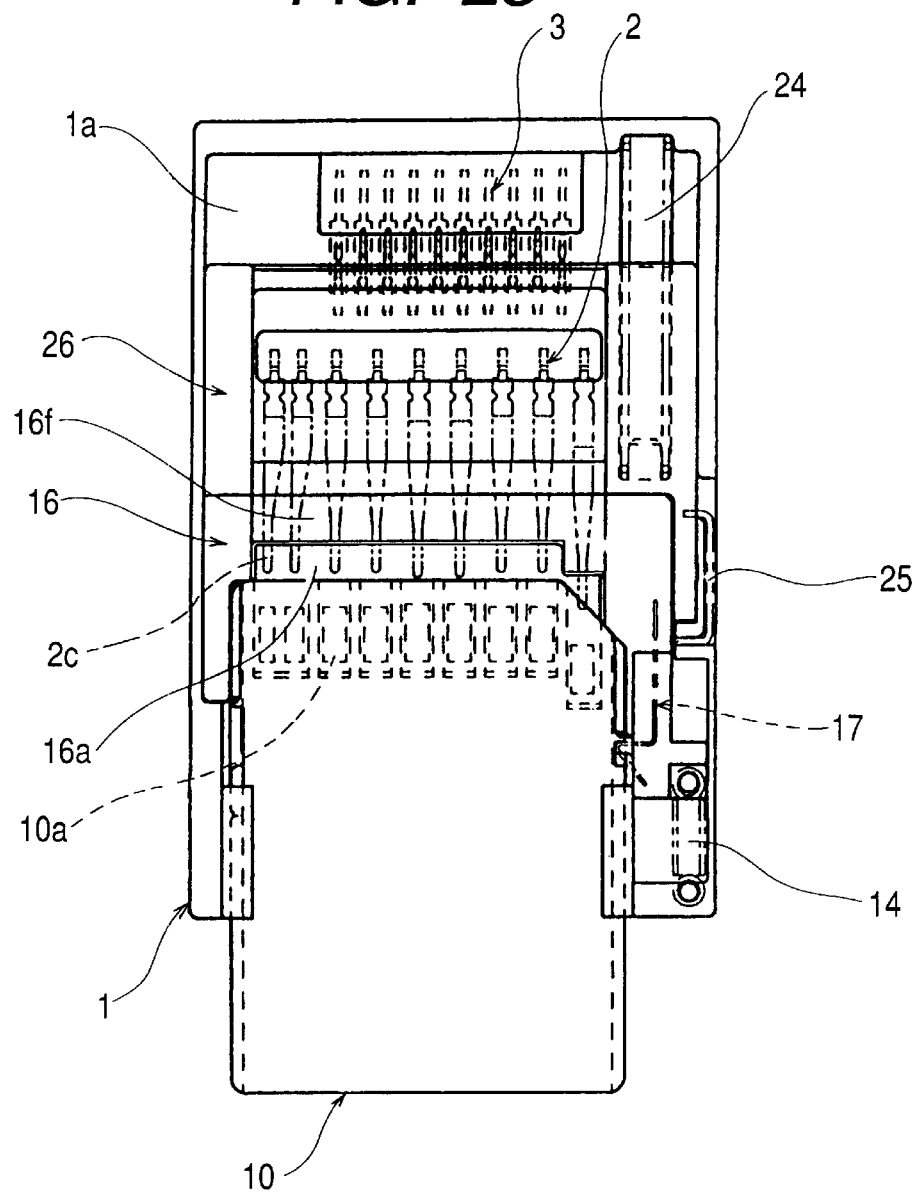
FIG. 23 is a plan view showing a card connector apparatus at the time of ejection of the first card of the same of the invention.
Figure 24:
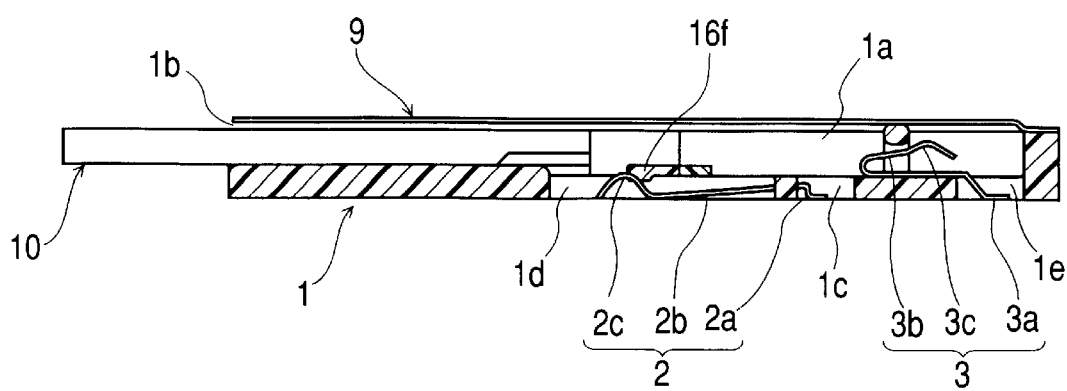
FIG. 24 is a longitudinal sectional view showing the card connector apparatus at the time of ejection of the first card of the same of the invention.
Figure 25:
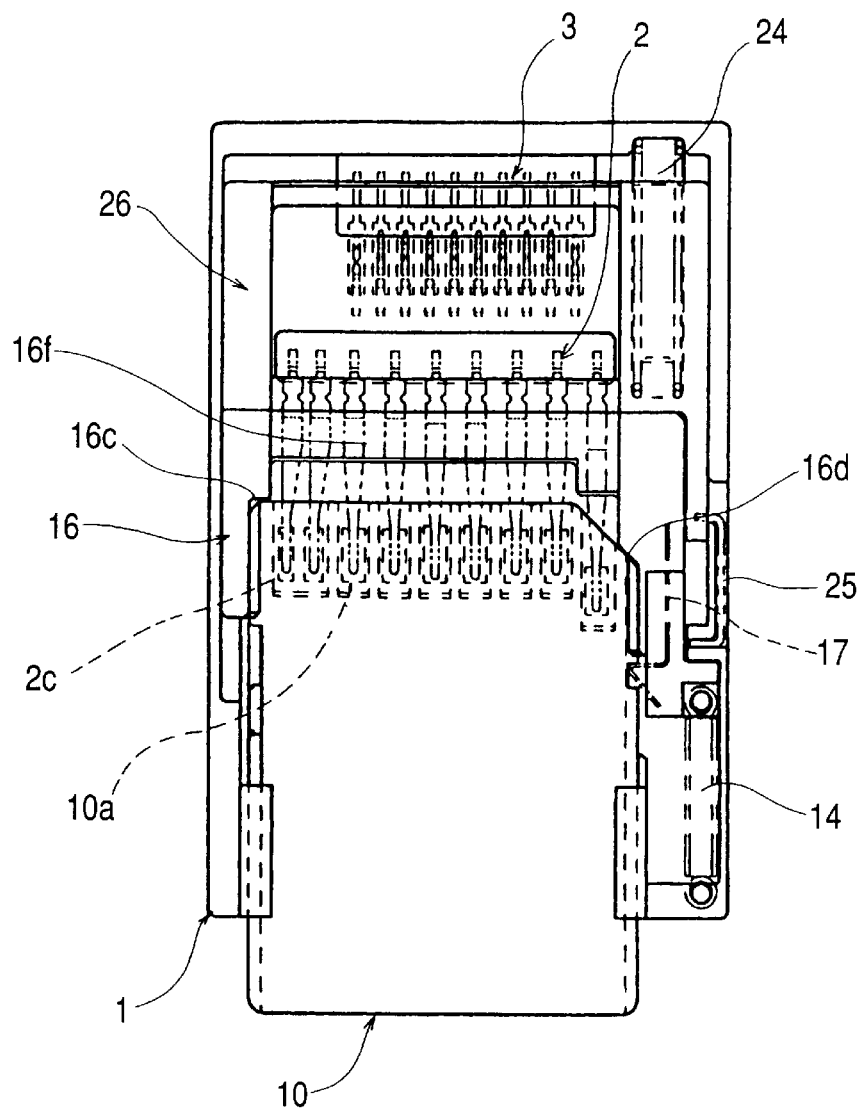
FIG. 25 is a plan view showing the card connector apparatus at the time of installation of the first card of the same of the invention.
Figure 26:
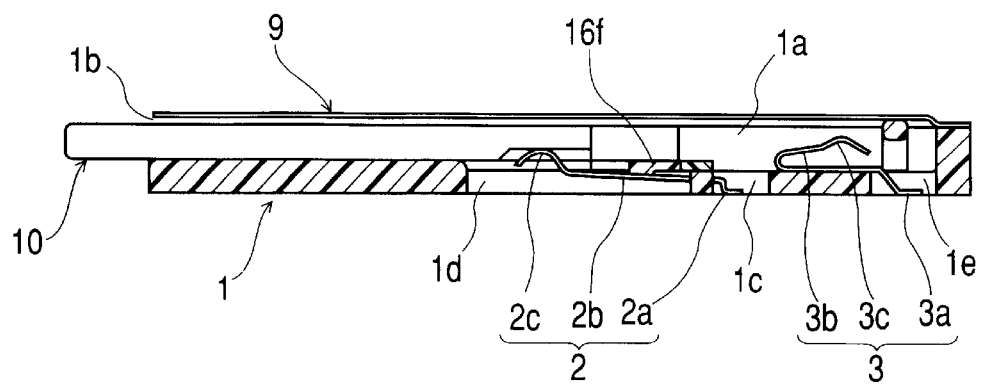
FIG. 26 is a longitudinal sectional view showing the card connector apparatus at the time of installation of the first card of the same of the invention.
Figure 27:
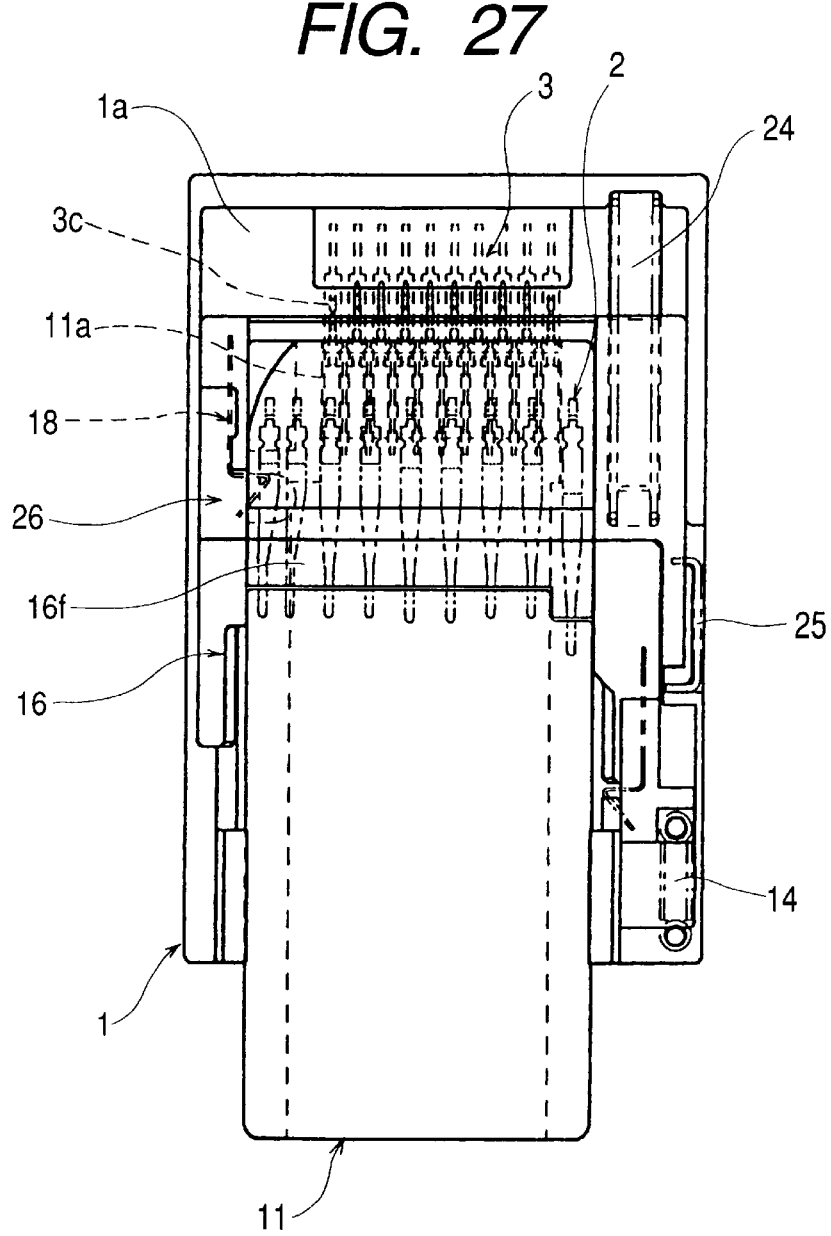
FIG. 27 is a plan view showing the card connector apparatus at the time of ejection of the second card of the same of the invention.
Figure 28:
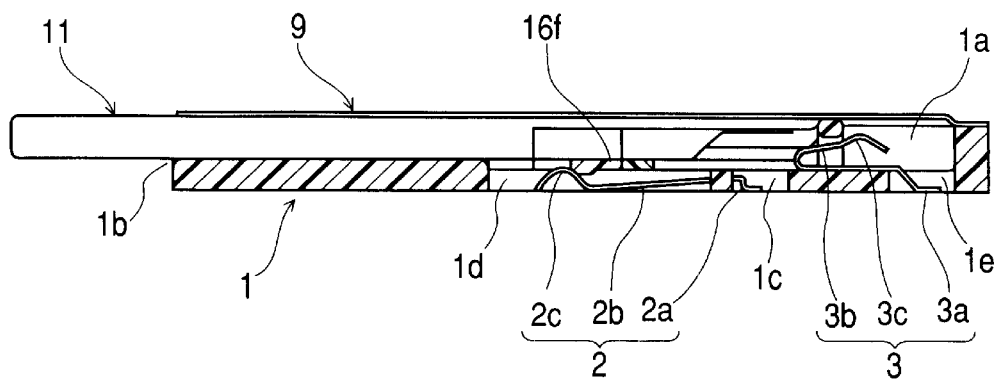
FIG. 28 is a longitudinal sectional view showing the card connector apparatus at the time of ejection of the second card of the same of the invention.
Figure 29:
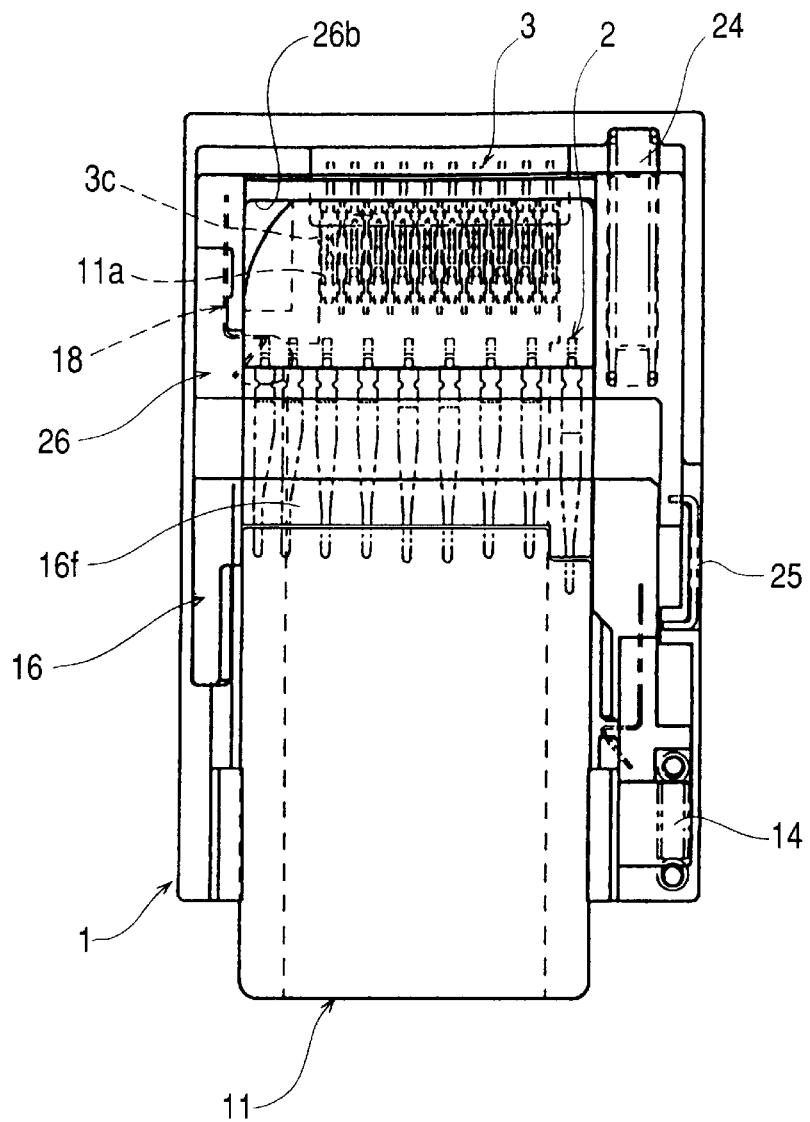
FIG. 29 is a plan view showing the card connector apparatus at the time of installation of the second card of the same of the invention.
Figure 30:
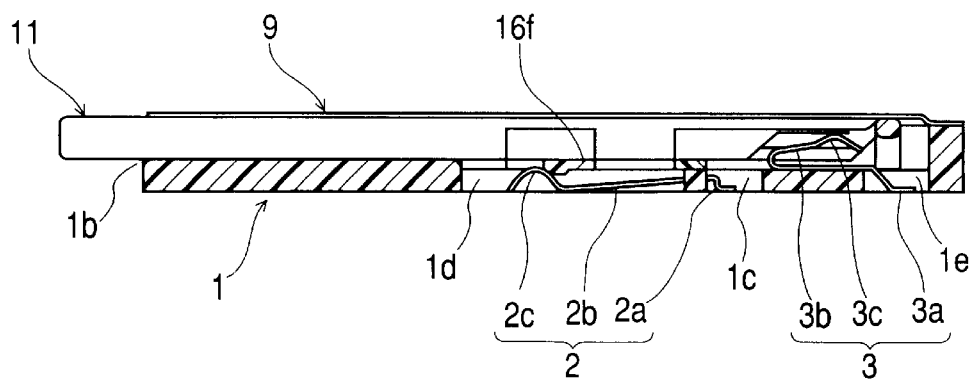
FIG. 30 is a longitudinal sectional view showing the card connector apparatus at the time of installation of the second card of the same of the invention.

Hereinafter, embodiments of the invention are shown in FIGS. 1 to 30. FIG. 1 is a plan view of a card connector apparatus, FIG. 2 is a plan view of the same in a state where a cover is removed, FIG. 3 is a plan view of a housing, FIG. 4 is a plan view of a slide member, FIG. 5 is a plan view of a first card, FIG. 6 is a front view of the same, FIG. 7 is a bottom view of the same, FIG. 8 is a plan view of a second card, FIG. 9 is a front view of the same, FIG. 10 is a bottom view of the same, FIG. 11 is a plan view of the card connector apparatus at the time of ejection of the fist card, FIG. 12 is a longitudinal sectional view of the same, FIG. 13 is a plan view of the card connector apparatus at the time of installation of the first card, FIG. 14 is a longitudinal sectional view of the same, FIG. 15 is a plan view of the card connector apparatus at the time of ejection of the second card, FIG. 16 is a longitudinal sectional view of the same, FIG. 17 is a plan view of the card connector apparatus at the time of installation of the second card, FIG. 18 is a longitudinal sectional view of the same, FIG. 19 is a partial explanatory view showing a state of engagement with a holding member at the time of ejection of the first card, FIG. 20 is a partial explanatory view showing a state of engagement with the holding member at the time of installation of the first card, FIGS. 21 to 30 show another embodiment, FIG. 21 is a plan view of a first slide member, FIG. 22 is a plan view of a second slide member, FIG. 23 is a plan view of a card connector apparatus at the time of ejection of the first card, FIG. 24 is a longitudinal sectional view of the same, FIG. 25 is a plan view of the card connector apparatus at the time of installation of the first card, FIG. 26 is a longitudinal sectional view of the same, FIG. 27 is a plan view of the card connector apparatus at the time of ejection of the second card, FIG. 28 is a longitudinal sectional view of the same, FIG. 29 is a plan view of the card connector apparatus at the time of installation of the second card, and FIG. 30 is a longitudinal sectional view of the same.

In FIGS. 1 to 4, a housing 1 is made of an insulating material such as synthetic resin and is formed into a square box shape with front and upper openings. A storage portion 1a is provided at the center of this housing 1, and a card insertion portion 1b continuous with the storage portion 1a and extending to the front of the housing 1 is formed in the housing 1.

In the storage portion 1a, a plurality of first and second connector terminals 2 and 3 made of conductive metal material are arranged side by side. The first connector terminals 2 are disposed substantially at the center position of the storage portion 1a, and each of them is formed of a flat plate-like base portion, and a connection piece 2a and a contact piece 2b formed in the directions opposite to each other from this base portion and to be bent substantially into a z shape. The first connector terminal 2 is disposed so that the connection piece 2a formed at one end side is exposed to the outside from a first opening portion 1c provided in a bottom portion of the storage portion 1a, and this connection piece 2a is soldered and fixed to a circuit pattern on an external circuit board of an electronic equipment or the like, so that signal transmission is carried out.

Besides, the contact piece 2b formed at the other end side of the base portion of the first connector terminal 2 is disposed to protrude into the storage portion 1a from a second opening portion 1d provided in the bottom portion of the storage portion 1a. Besides, a contact portion 2c to be connected to a contact terminal portion 10a of a first card described later is formed at the front end side of the contact piece 2b.

The second connector terminal 3 is disposed to be deeper in the storage portion 1a than the disposal position of the first connector terminal 2, and is formed of a flat plate-like base portion, and a connection piece 3a and a contact piece 3b formed to be bent in directions opposite to each other from this base portion. The second connector terminal 3 is disposed so that the connection piece 3a formed at one end side is exposed to the outside from a third opening portion 1e provided in the bottom portion of the storage portion 1a, and this connection piece 3a is soldered and fixed to a circuit pattern on an external circuit board of an electronic equipment or the like, so that signal transmission is carried out.

Besides, the contact piece 3b formed to be bent substantially into a U shape at the other end side of the base portion of the second connector terminal 3 is disposed to protrude into the storage portion 1a. Besides, a contact portion 3c to be connected to a contact terminal portion 11a of a second card 11 described later is formed at the front end side of the contact piece 3b.

Besides, the card insertion portion 1b is provided with a flat portion if made of a plane for guiding plane portions of the first and the second cards 10 and 11 described later, and a pair of guide portions 1g, 1g for guiding side portions of the first and the second cards 10 and 11 described later are formed at both sides of the flat portion if. Besides, the card insertion portion 1b is formed so that the maximum width is substantially equal to the width of the first card 10, and the maximum thickness is substantially equal to the thickness of the second card 11.

Besides, a spring reception portion 1h for receiving a return spring 4 made of a coil spring for urging a slide member 6 described later toward a card ejecting direction is formed at a one side rear portion of the housing 1. Besides, a shaft hole 1i for rotatably supporting one end of a lock pin 5, which holds the slide member 6 to a card installation position and is made of a metal wire material, is formed at a one side front portion opposite to this spring reception portion 1h.

Besides, a press contact portion 1j protruding from the bottom of the storage portion 1a is formed at the other side center portion of the housing 1, and a tongue piece portion 8c of a second holding member 8 fixed to the slide member 6 described later comes in contact with the press contact portion 1j and is supported.

The slide member 6 is formed of an insulating material such as synthetic resin. This slide member 6 is provided with a first card reception portion 6a positioned on this side and receiving the first card 10 described later and a second card reception portion 6b positioned behind the first card reception portion 6a and receiving the second card 11 described later.

A pair of fastening portions 6c and 6d to come in contact with both side front end portions of the first card 10 are formed at opposite positions of the inside portions of the first card reception portion 6a. The width size between the first fastening portions 6c and 6d is formed to be narrower than the width of the first card 10 and wider than the width of the second card 11. Besides, a second fastening portion 6e of a cross rail shape to come in contact with the front edge portion of the second card 11 is formed at the front end portion of the second card reception portion 6b.

Besides, a presser plate portion 6f suspended like a cross rail is formed at the front of the first card reception portion 6a. In the state where the slide member 6 is moved to a card ejection position, the presser plate portion 6f comes in contact with the contact pieces 2b of the first connector terminals 2 to restrain the contact pieces 2b of the first connector terminals 2 from protruding into the storage portion 1a.

Besides, a first holding member 7, which engages with a holding concave portion 10e provided at a side portion of the first card 10 to be received and is made of a metal plate or the like having a spring property, is fixed to one side portion of the first card reception portion 6a, and a second holding member 8, which engages with a holding concave portion 11c provided at a side portion of the second card 11 to be received and is made of a metal plate or the like having a spring property, is fixed to one side portion of the second card reception portion 6b.

The first and the second holding members 7 and 8 are formed of support piece portions 7a and 8a supported like a cantilever, engagement piece portions 7b and 8b provided at free end sides of the support piece portions 7a and 8a, and tongue piece portions 7c and 8c provided opposite to the engagement piece portions 7b and 8b. The tongue piece portions 7c and 8c are provided with inclined surfaces 7d and 8d bent outward at free end sides of the support piece portions 7a and 8a.

Then, when the slide member 6 is moved to the card installation position, the tongue piece portions 7d and 8d come in contact with press contact portion 9a of a cover member 9 described later and the press contact portion 1j of the housing 1, so that the engagement piece portions 7b and 8b, together with the support piece portions 7a and 8a, are restrained from coming away from the holding concave portions 10e and 11c of the cards. At this time, the press contact portions 9a and 1j are brought into slide contact with the inclined surfaces 7d and 8d, so that the support piece portions 7a and 8a are curved and urged, and the engagement piece portions 7b and 8b come in elastic contact with the holding concave portions 10e and 11c of the cards.

As stated above, since the holding members 7 and 8 are constructed by using the spring properties of the metal plates themselves having the spring properties, the card can be held at the installation position by the simple structure.

Besides, a spring fastening portion 6g to which one end side of the return spring 4 received in the spring reception portion 1h of the housing 1 is fastened, is provided in the slide member 6, and a heart-shaped cam groove 6h with which the other end of the lock pin 5 supported at one end side of the housing 1 is brought into slide contact, is formed at one end side of the slide member 6. By cooperation of the lock pin 5 and the heart-shaped cam groove 6h, the slide member 6 is held at the card installation position against the urging force of the return spring 4.

The cover member 9 is formed of a conductive metal plate, and is attached to an upper surface side of the housing 1 so as to cover the opening portion of the housing 1 at the upper surface side. The press contact portion 9a protruded to the side of the storage portion 1a of the housing 1 by cutting and bending is formed at one side portion of the cover member 9, and the tongue piece portion 7c of the first holding member 7 fixed to the slide member 6 comes in contact with the press contact portion 9a and is supported. Besides, an urging spring piece 9b for urging the lock pin 5 supported in the housing 1 to be brought into slide contact with the heart-shaped cam groove 6h of the slide member 6 is formed by cutting and bending at a position corresponding to the lock pin 5.

Incidentally, the cover member 9 is formed so as to cover the upper surfaces of the first and the second connector terminals 2 and 3 disposed in the storage portion 1a of the housing 1, and also functions as a shield plate to prevent intrusion of radiation noise or the like from the outside.

In FIGS. 5 to 7, the first card 10 contains an integrated circuit (IC) in the inside and is widely used as a recording medium. A plurality of contact terminal portions 10a are formed on one surface of the first card 10 at one end side thereof, and the contact terminal portions 10a come in contact with the contact pieces 2b of the first connector terminals 2 disposed in the storage portion 1a of the housing 1, so that various information processings to an externally connected electronic equipment are carried out.

Besides, in the first card 10, an inclined cut portion 10b is provided at one corner at the formation side of the contact terminal portion 10a. When the first card 10 is inserted in the first card reception portion 6a of the slide member 6, this cut portion 10b and a corner portion at the other end side are engaged with the first fastening portions 6c and 6d of the first card reception portion 6a of the slide member 6, so that the slide member 6 can be moved in the insertion direction in accordance with the insertion of the first card 10.

Besides, a concave groove portion 10c as an identification portion showing write inhibit of a card is formed in one side portion of the first card 10, and a slidable identifier 10d is provided in this concave groove portion 10c. The position of the concave groove portion 10c can be changed by sliding and moving this identifier 10d, and in accordance with this position, permission/nonpermission of writing to the card can be changed.

Besides, the holding concave portion 10e is formed at the other side portion of the first card 10. The first engagement piece 7 provided at the one side portion of the first card reception portion 6a and having the spring property is engaged with this holding concave portion 10e, so that the first card 10 is held in the first card reception portion 6a of the slide member 6.

Incidentally, long cut groove portions 10f are formed at both end portions of the first card 10 at the lower surface side, and the maximum width size except for this cut groove portions 10f is formed to be a little wide, whereas the maximum thickness size is formed to be a little thin.

In FIGS. 8 to 10, the second card 11 contains an integrated circuit (IC) in the inside and is widely used as a recording medium. A plurality of contact terminal portions 11a are formed on one surface of the second card 11 at one end side thereof, and the contact terminal portions 11a come in contact with the contact pieces 3b of the second connector terminals 3 disposed in the storage portion 1a of the housing 1, so that various information processings to an externally connected electronic equipment are carried out.

Besides, a cut portion 11b made of an inclined surface is formed at one end portion of the second card 11, and a holding concave portion 11c is formed at one side portion of the second card 11 to be spaced a definite distance apart from this cut portion 11b. When the second card 11 is inserted into the second card reception portion 6b of the slide member 6, the second engagement piece 8 provided at the one side portion of the second card reception portion 6b and having the spring property is engaged with the holding concave portion 11c, so that the second card 11 is held in the second card reception portion 6b of the slide member 6.

When the second card 11 is inserted in the second card reception portion 6b of the slide member 6, a front edge portion of the second card 11 comes in contact with the second fastening portion 6e of the second card reception portion 6b of the slide member 6, so that the slide member 6 can be moved in the insertion direction in accordance with the insertion of the second card 11.

Incidentally, the second card 11 is formed to be a substantially rectangular parallelepiped, and as compared with the first card 10, the maximum width size is formed to be a little narrow, whereas the maximum thickness size is formed to be a little thick. Besides, the length in the insertion direction is longer than the first card 10 and is formed to be long.

Like the above structure, in the case where the first card 10 and the second card 11 different from each other in shape are inserted into the card insertion portion 1b of the housing 1, in the structure of the above embodiment, the guide portions 1g, 1g of the card insertion portion 1b are formed so that the maximum width is substantially equal to the width of the first card 10 which is wide and thin, and the maximum thickness is substantially equal to the thickness of the second card 11 which is narrow and thick, so that the first and the second cards 10 and 11 can be inserted, and plural kinds of cards having different shapes can be smoothly and certainly guided to the installation positions of the cards.

Besides, the second card 11 is longer than the first card 10 in the insertion direction and is formed to be long, and the first connector terminals 2 to come in contact with the contact terminal portions 10a of the first card 10 and the second connector terminals 3 to come in contact with the contact terminal portions 11a of the second card 11 are disposed in the storage portion 1a of the housing 1 at positions different from each other in the insertion direction of the card and correspondingly to the formation positions of the contact terminal portions 10a and 11a, so that plural kinds of cards having different shapes can be certainly brought into contact with the connector terminals of the connector apparatus for installation of these.

Besides, the disposal positions of the second connector terminals 3 disposed in the storage portion 1a of the housing 1 are formed to be deeper in the card insertion portion than the disposal positions of the first connector terminals 2, and the protrusion position of the rear edge portion of the first card 10 installed in the housing 1 becomes substantially equal to the protrusion position of the rear edge portion of the second card 11 installed in the housing 1, and accordingly, even in the case where plural kinds of cards having different shapes are installed in the same card connector apparatus, the protrusion positions do not become irregular and the appearance becomes excellent.

Next, the operation in the case where the first card 10 and the second card 11 are inserted into the connector apparatus will be described by the use of FIGS. 11 to 20.

First, in an initial state, that is, in a case where the first card 10 is at an ejection position, the slide member 6 is urged toward the ejecting direction of the card by the urging force of the return spring 4, and the contact pieces 2b of the first connector terminals 2 are restrained by the presser plate portion 6f of the slide member 6 from protruding into the storage portion 1a. In this case, the contact terminal portions 10a of the first card 10 are separate from the contact portions 2c of the contact pieces 2b. At this time, the holding concave portion 10e is engaged with the engagement piece portion 7b of the first holding member 7 and the first card 10 is held in the first card reception portion 6a (FIG. 11, FIG. 12).

Incidentally, at this time, the tongue piece portion 7c provided opposite to the engagement piece portion 7b of the first holding member 7 is not in contact with the press contact portion 9a provided to protrude in the cover member 9 but is separate from it, and in the case where the first card 10 is extracted in this state, the support piece portion 7a of the first holding member 7 is bent so that it can be easily extracted (FIG. 19).

Next, when the first card 10 is pressed in the insertion direction of the card, the cut portion 10b of the card 10 and the corner portion of the other end side are engaged with the first fastening portions 6c and 6d of the first card reception portion 6a of the slide member 6, so that the slide member 6 can be moved in the insertion direction in accordance with the insertion of the first card 10, the slide member 6 is moved in the insertion direction of the card against the urging force of the return spring 4, and one end portion of the lock pin 5 traces the heart-shaped cam groove 6h and is locked at a lock position (FIG. 13, FIG. 14).

In this case, the presser plate portion 6f of the slide member 6 comes away from the restraint position of the contact pieces 2b of the first connector terminals 2, and the contact terminal portions 10a of the first card 10 come in contact with the contact portions 2c of the contact pieces 2b. At this time, the tongue piece portion 7c formed opposite to the engagement piece portion 7b of the first holding member 7 is pressed by the press contact portion 9a provided in the cover member 9, and accordingly, the engagement piece portion 7b is supported so as not to come away from the holding concave portion 10e of the first card, and the first card 10 is certainly held at the installation position of the card (FIG. 20).

Next, in an initial state of the second card 11, that is, in a case where it is at an ejection position, the slide member 6 is urged toward the ejecting direction of the card by the urging force of the return spring 4, and the contact pieces 2b of the first connector terminals 2 are restrained by the presser plate portion 6f of the slide member 6 from protruding into the storage portion 1a. Besides, the contact terminal portions 11a of the second card 11 are separate from the contact portions 3c of the contact pieces 3b of the second connector terminals 3. At this time, the holding concave portion 11c is engaged with the engagement piece portion 8b of the second holding member 8, and the second card 11 is held in the second card reception portion 6b (FIG. 15, FIG. 16).

Next, when the second card 11 is pressed in the insertion direction of the card, the front edge portion of the second card 11 is engaged with the second fastening portion 6e of the second card reception portion 6b of the slide member 6, so that the slide member 6 can be moved in the insertion direction in accordance with the insertion of the second card 11, the slide member 6 is moved in the insertion direction of the card against the urging force of the return spring 4, and the one end portion of the lock pin 5 traces the heart-shaped cam groove 6h and is locked at the lock position (FIG. 17, FIG. 18).

In this case, the presser plate portion 6f of the slide member 6 comes away from the restraint position of the contact pieces 2b of the first connector terminals 2, and the bottom of the second card 11 comes in slide contact with the contact pieces 2b of the first connector terminals 2, however, this slide contact distance is slight, and on the contrary, in the process in which the second card 11 is inserted to the installation position of the card, the contact pieces 2b of the first connector terminals 2 are restrained from protruding into the storage portion 1a, and accordingly, when a long card such as the second card 11 is inserted, it is possible to prevent the insertion resistance from increasing, and to prevent the occurrence of abrasion or the like.

Besides, at this time, the tongue piece portion 8c formed opposite to the engagement piece portion 8b of the second holding member 8 is pressed by the press contact portion 1j provided in the housing 1, so that the engagement piece portion 8b is supported so as not to come away from the holding concave portion 11c of the second card 11, and the second card 11 is certainly held at the installation position of the card.

As stated above, the engagement piece portions 7b and 8b to engage with the holding concave portions 10e and 11c of the first and the second cards 10 and 11 and the support piece portions 7a and 8a to elastically support the engagement piece portions 7b and 8b are formed in the first and the second holding members 7 and 8, and the press contact portions 9a and 1j, which are separate from the support piece portions 7a and 8a at the card ejection position and come in contact with the support piece portions 7a and 8a at the card installation position to make the engagement piece portions 7b and 8b engage with the holding concave portions 10e and 11c of the first and the second cards 10 and 11, are formed in the housing 1 and the cover member 9, and accordingly, the elastic force of the engagement portion can be raised in the state where the card is installed, and the elastic force of the engagement portion can be weakened at the time of ejection of the card. Therefore, at the time of installation of the card, the card can be certainly held, and at the time of ejection of the card, the card can be easily extracted.

Besides, the first card 10 is formed to be wide and thin, the second card 11 is formed to be narrower and thicker than the first card 10, the first fastening portions 6c and 6d formed in the first card reception portion 6a for receiving the first card 10 are formed at the opposite positions of the inside portions of the slide member 6, and the width size between the first fastening portions 6c and 6d is formed to be narrower than the width size of the first card 10 and wider than the width size of the second card 11. Thus, at the time of insertion of the second card 11, the second card 11 passes the first fastening portions 6c and 6d and comes in contact with the second fastening portion 6e, and accordingly, in the insertion process, it is possible to prevent the second card 11 from coming in slide contact with the first connector terminals 2, and the contact terminal portions 11a of the second card 11 can be brought into direct contact with the second connector terminals 3.

Besides, the slide member 6 is formed to be urged toward the card ejecting direction by the return spring 4, and means for locking the slide member 6 at the card installation position is constructed such that the heart-shaped cam groove 6h is formed in the slide member 6, and the other end portion of the engagement pin 5 one end portion of which is engaged with the heart-shaped cam groove 6h is supported in the housing 1, so that a card can be locked at the installation position by the simple structure, and the card can be smoothly ejected to the ejection position.

FIGS. 21 and 22 show another embodiment of the slide member 6, and this case is different from the structure shown in FIGS. 1 to 4 in that the slide member 6 is divided into a first slide member 16 and a second slide member 26.

Incidentally, the same parts as those explained in FIGS. 1 to 4 are designated by the same symbols and the explanation is omitted.

In this case, the first slide member 16 is provided with a first card reception portion 16a in which the first card 10 is received, and a pair of first fastening portions 16c and 16d to come in contact with both side front end portions of the first card 10 are formed at opposite positions of the inside portions of the first card reception portion 16a. The width size between the first fastening portions 16c and 16d is formed to be narrower than the width of the first card 10 and to be wider than the width of the second card 11.

Besides, a presser plate portion 16f suspended like a cross rail is formed at the front of the first card reception portion 16a. In the state where the first slide member 16 is moved to a card ejection position, the presser plate portion 16f comes in contact with the contact pieces 2b of the first connector terminals 2, and restrains the contact pieces 2b of the first connector terminals 2 from protruding into the storage portion 1a.

Besides, a first holding member 17, which engages with the holding concave portion 10e provided at the side portion of the first card 10 to be received and is made of a metal plate or the like having a spring property, is fixed to one side portion of the first card reception portion 16a. Besides, a first return spring 14 to urge the first slide member 16 toward the card ejecting direction is disposed at one end side, and a heart-shaped cam groove (not shown) with which a lock pin (not shown) supported in the housing 1 is brought into slide contact is formed at the other end side.

The second slide member 26 is provided with a second card reception portion 26a in which the second card 11 is received, and a second fastening portion 26b of a cross rail shape to come in contact with the front edge of the second card 11 is formed at the front end portion of the second card reception portion 26a.

Besides, a second holding member 18, which engages with the holding concave portion 11c provided at the side portion of the second card 11 to be received and is made of a metal plate or the like having a spring property, is fixed to one side portion of the second card reception portion 26a. Besides, there is provided a spring fastening portion 26c to which one end side of a second return spring 24 received in the spring reception portion 1i of the housing 1 is fastened, and a heart-shaped cam groove (not shown) with which a lock pin 25 supported in the housing 1 is brought into slide contact is formed at one end side of the second slide member 26.

Next, the operation in the case where the first card 10 and the second card 11 are inserted into the connector apparatus will be described by the use of FIGS. 23 to 30.

First, in an initial state, that is, in a case where the first card 10 is at an ejection position, the first slide member 16 and the second slide member 26 are urged toward a card ejecting direction by the urging forces of the first return spring 14 and the second return spring 24 in the state where they are overlapped with each other in front and in rear, and the contact pieces 2b of the first connector terminals 2 are restrained by the presser plate portion 16f of the first slide member 16 from protruding into the storage portion 1a. In this case, the contact terminal portions 10a of the first card 10 are separate from the contact portions 2c of the contact pieces 2b. At this time, the first card 10 is held in the first card reception portion 16a by the first holding member 17 (FIG. 23, FIG. 24).

Next, when the first card 10 is pressed in the card insertion direction, the cut portion 10b of the first card 10 and the corner portion of the other end side are engaged with the first fastening portions 16c and 16d of the first card reception portion 16a of the first slide member 16, so that the first slide member 16 and the second slide member 26 can be moved in the insertion direction in accordance with the insertion of the first card 10, and both the first slide member 16 and the second slide member 26 are moved in the card insertion direction against the urging forces of the first return spring 14 and the second return spring 24, and are locked at the lock position of the not-shown heart-shaped cam groove by the lock pin 25 and the like.

In this case, the presser plate portion 16f of the first slide member 16 comes away from the restraint position of the contact pieces 2b of the first connector terminals 2, and the contact terminal portions 10a of the first card 10 come in contact with the contact portions 2c of the contact pieces 2b (FIG. 25, FIG. 26).

Next, in an initial state of the second card 11, that is, in a case where it is at an ejection position, the first slide member 16 and the second slide member 26 are urged toward the card ejecting direction by the urging forces of the first return spring 14 and the second return spring 24, and the contact pieces 2b of the first connector terminals 2 are restrained by the presser plate portion 16f of the first slide member 16 from protruding into the storage portion 1a. Besides, the contact terminal portions 11a of the second card 11 are separate from the contact portions 3c of the contact pieces 3b of the second connector terminals 3. At this time, the second card 11 is inserted through the first card reception portion 16a of the first slide member 16, and is held in the second card reception portion 26a by the second holding member 18 (FIG. 27, FIG. 28).

Next, when the second card 11 is pressed in the card insertion direction, the front edge portion of the second card 11 is engaged with the second fastening portion 26b of the second card reception portion 26a of the second slide member 26, so that the second slide member 26 can be moved in the insertion direction in accordance with the insertion of the second card 11, and only the second slide member 26 is moved in the card insertion direction against the urging force of the second return spring 24, and is locked at the lock position of the not-shown heart-shaped cam groove by the lock pin 25 (FIG. 29, FIG. 30).

In this case, since the first slide member 16 is not moved, and the presser plate portion 16f restrains the contact pieces 2b of the first connector terminals 2, the bottom of the second card 11 does not come in slide contact with the contact pieces 2b of the first connector terminals 2, and in the process in which the second card 11 is inserted to the card installation position, since the contact pieces 2b of the first connector terminals 2 are restrained from protruding into the storage portion 1a, when a long card such as the second card 11 is inserted, it is possible to prevent the insertion resistance from increasing or to completely prevent the occurrence of abrasion or the like.

As described above, in the card connector apparatus of the invention, since both a first card and a second can be ejected by the slide member, there is obtained an effect that both the first card and the second card can be ejected by a simple structure without enlargement.

The card connector apparatus of the invention comprises a housing including a storage portion in which both a first short card and a second long card can be installed, a first connector terminal to be connected with a contact terminal portion of the first card, a second connector terminal to be connected with a contact terminal portion of the second card, the first and the second connector terminals being arranged in two lines in front and in rear in a card insertion direction of the storage portion, a slide member disposed to be movable in the card insertion direction in accordance with insertion of the card, and lock means for locking the slide member at a card installation position, wherein the slide member is provided with a presser plate portion to come in contact with the first connector terminal at a card ejection position to restrain the first connector terminal from protruding into the storage portion, first fastening portions provided at a front side and not coming in contact with the second card but coming in contact with only a front end portion of the first card, and a second fastening portion provided behind the first fastening portions and coming in contact with only a front end portion of the second card, and at a time of insertion of the second card, after the second card passes the first fastening portions to come in contact with the second fastening portion, the slide member is moved from the card ejection position to the card installation position, and the first connector terminal comes away from restraint of the presser plate portion and protrudes into the card storage portion, whereby in a process in which the second card is inserted to the installation position, since the contact piece of the first connector terminal is restrained from protruding into the storage portion, when a long card such as the second card is inserted, it is possible to prevent the insertion resistance from increasing or to prevent the occurrence of abrasion or the like.

Besides, the card connector apparatus of the invention comprises a housing including a storage portion in which both a first short card and a second long card can be installed, a first connector terminal to be connected with a contact terminal portion of the first card, a second connector terminal to be connected with a contact terminal portion of the second card, the first and the second connector terminals being arranged in two lines in front and in rear in a card insertion direction of the storage portion, a slide member disposed to be movable in the card insertion direction in accordance with insertion of the card, and lock means for locking the slide member at a card installation position, wherein the slide member is divided in two parts in front and in rear to include a first slide member and a second slide member, the first slide member is provided with a presser plate portion to come in contact with the first connector terminal at a card ejection position to restrain the first connector terminal from protruding into the storage portion, and first fastening portions provided at a front side and not coming in contact with the second card but coming in contact with only a front end portion of the first card, the second slide member is provided with a second fastening portion provided at a rear side and coming in contact with only a front end portion of the second card, and at a time of insertion of the first card, after the first card comes in contact with the first fastening portions, the first slide member is moved to the card installation position while pressing the second slide member, and at a time of insertion of the second card, after the second card passes the first fastening portions to come in contact with the second fastening portion, only the second slide member is moved to the card installation position, whereby the first slide member is not moved, but the presser plate portion always restrains the contact piece of the first connector terminal, so that the bottom of the second card does not come in slide contact with the contact piece of the first connector terminal, and when a long card such as the second card is inserted, it is possible to prevent the insertion resistance from increasing or to prevent the occurrence of abrasion or the like.

Besides, the first card is formed to be wide and thin, the second card is formed to be narrower and thicker than the first card, the first fastening portions are formed at opposite positions of inside portions of the slide member, and a width between the first fastening portions is narrower than a width of the first card and wider than a width of the second card, whereby at the time of insertion of the second card, the second card passes the first fastening portion to come in contact with the second fastening portion, and accordingly, it is possible to prevent the second card from coming in slide contact with the first connector terminal in an insertion process, and it becomes possible to make the contact terminal portion of the second card come in direct contact with the second connector terminal.

Besides, the slide member is urged toward a card ejecting direction by an urging member, and the lock means is constituted by a heart-shaped cam groove formed at one of the slide member and the housing, and an engagement pin provided at the other and engaging with the heart-shaped cam groove, whereby the card can be locked at the installation position by the simple structure, and the card can be smoothly ejected to the ejection position.

What is claimed is:

1. A card connector apparatus comprising:

a housing including a storage portion in which both a first short card and a second long card can be installed;

a first connector terminal to be connected with a contact terminal portion of the first card;

a second connector terminal to be connected with a contact terminal portion of the second card, the first and the second connector terminals being arranged in two lines in front and in rear in a card insertion direction of the storage portion;

a slide member disposed to be movable in the card insertion direction;

urging member for urging the slide member in a card ejecting direction; and lock means for locking the slide member at a card installation position against an urging force of the urging member, wherein the slide member is provided with first fastening portions allowing the second card to pass without contact and coming in contact with only a front end portion of the first card, and a second fastening portion provided behind the first fastening portions with respect to card insertion and coming in contact with only a front end portion of the second card, and lock by the lock means is released and the slide member is moved in the card ejecting direction to eject the first card and the second card.

2. A card connector apparatus according to claim 1, wherein the lock means includes a heart-shaped cam groove formed at one of the slide member and the housing, and an engagement pin provided at the other and engaging with the heart-shaped cam groove, and the lock of the lock means is relieved by once pressing the first card and the second card.

3. A card connector apparatus comprising:

a housing including a storage portion in which both a first short card and a second long card can be installed;

a first connector terminal to be connected with a contact terminal portion of the first card;

a second connector terminal to be connected with a contact terminal portion of the second card, the first and the second connector terminals being arranged in two lines in front and in rear in a card insertion direction of the storage portion;

a slide member disposed to be movable in the card insertion direction in accordance with insertion of a card; and lock means for locking the slide member at a card installation position, wherein the slide member is provided with a presser plate portion to come in contact with the first connector terminal at a card ejection position to restrain the first connector terminal from protruding into the storage portion, first fastening portions provided at a front side and not coming in contact with the second card but coming in contact with only a front end portion of the first card, and a second fastening portion provided behind the first fastening portions and coming in contact with only a front end portion of the second card, and at a time of insertion of the second card, after the second card passes the first fastening portions to come in contact with the second fastening portion, the slide member is moved from the card ejection position to the card installation position, and the first connector terminal comes away from restraint of the presser plate portion and protrudes into the card storage portion.

4. A card connector apparatus according to claim 3, wherein the first card is wide and thin, the second card is narrower and thicker than the first card, the first fastening portions are formed at opposite positions of inside portions of the slide member, and a width between the first fastening portions is narrower than a width of the first card and wider than a width of the second card.

5. A card connector apparatus according to claim 3, wherein the slide member is urged toward a card ejecting direction by an urging member, and the lock means includes a heart-shaped cam groove formed at one of the slide member and the housing, and an engagement pin provided at the other and engaging with the heart-shaped cam groove.

6. A card connector apparatus comprising:

a housing including a storage portion in which both a first short card and a second long card can be installed;

a first connector terminal to be connected with a contact terminal portion of the first card;

a second connector terminal to be connected with a contact terminal portion of the second card, the first and the second connector terminals being arranged in two lines in front and in rear in a card insertion direction of the storage portion;

a slide member disposed to be movable in the card insertion direction in accordance with insertion of the card; and lock means for locking the slide member at a card installation position, wherein the slide member is divided in two parts in front and in rear to include a first slide member and a second slide member, the first slide member is provided with a presser plate portion to come in contact with the first connector terminal at a card ejection position to restrain the first connector terminal from protruding into the storage portion, and first fastening portions provided at a front side and not coming in contact with the second card but coming in contact with only a front end portion of the first card, the second slide member is provided with a second fastening portion provided at a rear side and coming in contact with only a front end portion of the second card, at a time of insertion of the first card, after the first card comes in contact with the first fastening portions, the first slide member is moved to the card installation position while pressing the second slide member, and at a time of insertion of the second card, after the second card passes the first fastening portions to come in contact with the second fastening portion, only the second slide member is moved to the card installation position.

7. A card connector apparatus according to claim 6, wherein the first card is wide and thin, the second card is narrower and thicker than the first card, the first fastening portions are formed at opposite positions of inside portions of the slide member, and a width between the first fastening portions is narrower than a width of the first card and wider than a width of the second card.

8. A card connector apparatus according to claim 6, wherein the slide member is urged toward a card ejecting direction by an urging member, and the lock means includes a heart-shaped cam groove formed at one of the slide member and the housing, and an engagement pin provided at the other and engaging with the heart-shaped cam groove.

* * * * *

UNITED STATES PATENT AND TRADEMARK OFFICE
CERTIFICATE OF CORRECTION

PATENT NO. : 6,641,413 B2
DATED : November 4, 2003
INVENTOR(S) : Yoshimasa Kuroda It is certified that error appears in the above-identified patent and that said Letters Patent is hereby corrected as shown below:

<u>Column 5,</u>
Line 21, add -- 10 -- after "card"
Lines 44 and 48, change "if" to -- If --

Signed and Sealed this

Nineteenth Day of October, 2004

JON W. DUDAS
*Director of the United States Patent and Trademark Office*